(12) United States Patent
Lu

(10) Patent No.: US 9,042,092 B2
(45) Date of Patent: May 26, 2015

(54) MONITOR FIXING MECHANISM FOR FIXING A MONITOR AND DISPLAY DEVICE THEREWITH

(75) Inventor: Shixiong Lu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 262 days.

(21) Appl. No.: 13/591,237

(22) Filed: Aug. 22, 2012

(65) Prior Publication Data

US 2013/0094127 A1    Apr. 18, 2013

(30) Foreign Application Priority Data

Oct. 18, 2011    (CN) .......................... 2011 1 0317431

(51) Int. Cl.
| | |
|---|---|
| *G06F 1/16* | (2006.01) |
| *F16M 11/06* | (2006.01) |
| *F16M 11/04* | (2006.01) |
| *F16M 11/08* | (2006.01) |
| *F16M 11/10* | (2006.01) |

(52) U.S. Cl.
CPC .............. *F16M 11/06* (2013.01); *F16M 11/08* (2013.01); *F16M 11/10* (2013.01); *F16M 11/041* (2013.01); *Y10S 248/917* (2013.01); *Y10S 248/918* (2013.01); *Y10S 248/919* (2013.01)

(58) Field of Classification Search
CPC ....... F16M 11/06; F16M 11/08; F16M 11/10; F16M 11/04; F16M 11/041; F16M 11/043; F16M 11/045; F16M 11/046; F16M 11/048; F16M 11/105
USPC ............. 361/679.01–679.45, 679.55–679.59; 248/917–924
See application file for complete search history.

(56) References Cited

U.S. PATENT DOCUMENTS 5,941,493 A * 8/1999 Cheng ........................... 248/371
7,195,214 B2 * 3/2007 Lee et al. .................... 248/125.8

(Continued)

FOREIGN PATENT DOCUMENTS

| CN | 1897798 A | 1/2007 |
|---|---|---|
| CN | 201017679 Y | 2/2008 |
| CN | 201177149 Y * | 1/2009 |
| JP | 200167012 A | 3/2001 |

OTHER PUBLICATIONS

Office action mailed on May 27, 2014 for the China application No. 201110317431.7, p. 3 line 6-14 and line 31, p. 4 line 1-7, line 13-16 and line 27-30 and p. 5 line 1-4, line 10-11 and line 15-23.

(Continued)

*Primary Examiner* — Nidhi Thaker
(74) *Attorney, Agent, or Firm* — Winston Hsu; Scott Margo

(57) ABSTRACT

A monitor fixing mechanism for fixing a monitor is disclosed. The monitor fixing structure includes a pivot plate and a support member. The pivot plate is detachably connected to the support plate so as to pivot the monitor relative to a stand. The support member includes a plate, at least one lateral guiding structure disposed on the plate for laterally constraining movement of the pivot plate as the pivot plate is sliding into the plate in a first direction, and at least one stopping structure disposed on the plate for stopping an end of the pivot plate as the pivot plate has slid into the plate in the first direction completely. The monitor fixing mechanism further includes a fastening module for fastening the pivot plate on the support member as the pivot plate has slid into the plate in the first direction completely.

4 Claims, 9 Drawing Sheets

(56) References Cited

U.S. PATENT DOCUMENTS

| | | | |
|---|---|---|---|
| 8,960,618 B2* | 2/2015 | Chen | 248/222.51 |
| 2004/0084579 A1* | 5/2004 | Lee et al. | 248/125.1 |
| 2004/0232298 A1* | 11/2004 | Bremmon et al. | 248/281.11 |
| 2007/0008686 A1* | 1/2007 | Jang | 361/681 |
| 2007/0097617 A1* | 5/2007 | Searby et al. | 361/686 |
| 2009/0256040 A1 | 10/2009 | Lee | |

OTHER PUBLICATIONS

Office action mailed on Nov. 26, 2014 for the China application No. 201110317431.7, p. 3 line 7-15, line 17-21 and line 24-32, p. 4 line 1-4, line 6-11, line 17-24 and line 27-30, p. 5 line 4-12, line 16-18 and 21-30 p. 6 line 1-11.

* cited by examiner

MONITOR FIXING MECHANISM FOR FIXING A MONITOR AND DISPLAY DEVICE THEREWITH

BACKGROUND OF THE INVENTION

1. Field of the Invention

The present invention relates to a monitor fixing mechanism for fixing a monitor and a display device therewith, and more particularly, to a monitor fixing mechanism with quick release design and a display device therewith.

2. Description of the Prior Art

With development of technology, a flat-panel display (FPD) has replaced a cathode ray tube (CRT) and become a trend in the display technology field. In contrast to a large volume and a heavy weight of the conventional cathode ray tube, the flat-panel display has advantages of low power consumption, less radiation and a thinning tendency. Increase of the size of the flat-panel display facilitates a thinning digital television to be popular in the entertainment field, such as a domestic entertainment, an outdoor advertisement, an exhibition and so on. As a result, how to design a fixing mechanism for fixing a display device with a stand becomes one of the critical issues of mechanisms of the display device. For example, with increase of transportation cost, a quick release mechanism is adopted for the flat-panel display and its stand for increasing loading quantity and reducing the transportation cost. However, a conventional quick release mechanism is to dispose a hook with a spring on a back cover of the flat-panel display for engaging with a Vesa plate on the base. Although the operation of the conventional quick release mechanism is easy, it occupies a specific volume on the back cover of the flat-panel display, resulting in disobeying the thinning tendency of the flat-panel display. In addition, the base can not be adapted to the back cover without the quick release mechanism, resulting in less community in use. How to design a monitor fixing mechanism with quick release design for meeting requirements of the thinning tendency as well as improving the community becomes an issue of the display device.

SUMMARY OF THE INVENTION

Thus, the present invention provides a monitor fixing mechanism with quick release design and a display device therewith for solving above drawbacks.

According to the claimed invention, a monitor fixing mechanism for fixing a monitor includes a pivot plate and a support member. The pivot plate is pivoted to a stand. The support member is connected to the monitor for supporting the monitor. The pivot plate is connected to the supporting member in a detachable manner, so as to pivot the monitor relative to the stand. The support member includes a plate, at least one lateral guiding structure and at least one stopping structure. The at least one lateral guiding structure is disposed on the plate for laterally constraining movement of the pivot plate when the pivot plate slides into the plate in a first direction. The at least one stopping structure is disposed on the plate for stopping a side of the pivot plate when the pivot plate has slid into the plate in the first direction completely. The monitor fixing mechanism further includes a fastening module for fastening the pivot plate on the support member when the pivot plate has slid into the plate in the first direction completely.

According to the claimed invention, at least one positioning slot is formed on the side of the pivot plate for engaging with the corresponding at least one stopping structure when the pivot plate has slid into the plate in the first direction completely, so as to position the pivot plate on the support member.

According to the claimed invention, the fastening module includes a quick-release screw disposed through an opening on the pivot plate for screwing the pivot plate on the support member.

According to the claimed invention, a breach is formed on the pivot plate, and the fastening module includes a latch and a resilient component. The latch is pivoted to the support member. The resilient component is connected to the latch for driving the latch to hook the breach on the pivot plate, so as to fix the pivot plate on the support member.

According to the claimed invention, an inclined plane is formed at an end of the latch, and the inclined plane is pushed by the pivot plate when the pivot plate slides into the plate in the first direction, so as to guide the latch to rotate.

According to the claimed invention, at least one first slot is formed on the pivot plate, at least one second slot and a hole are formed on the plate of the support member, the at least one second slot is located in a position corresponding to the at least one first slot, and the fastening module includes a release member, at least one protruding portion and a protruding button. An end of the release member is fixed to the support member. The at least one protruding portion is connected to the release member for disposing through the at least one first slot and the at least one second slot, so as to fix the pivot plate on the support member. The protruding button is disposed at another end of the release member for disposing through the hole on the plate. The protruding button drives the at least one protruding portion to separate from the at least one first slot and the at least one second slot in sequence when being pushed.

According to the claimed invention, the fastening module includes a quick-release screw disposed through an opening on the pivot plate for screwing the pivot plate on the support member.

According to the claimed invention, a breach is formed on the pivot plate, and the fastening module includes a latch and a resilient component. The latch is pivoted to the support member. The resilient component is connected to the latch for driving the latch to hook the breach on the pivot plate, so as to fix the pivot plate on the support member.

According to the claimed invention, a display device includes a monitor, a stand for supporting the monitor and a monitor fixing mechanism for fixing a monitor. The monitor fixing mechanism includes a pivot plate and a support member. The pivot plate is pivoted to the stand. The support member is connected to the monitor for supporting the monitor. The pivot plate is connected to the supporting member in a detachable manner, so as to pivot the monitor relative to the stand. The support member includes a plate, at least one lateral guiding structure and at least one stopping structure. The at least one lateral guiding structure is disposed on the plate for laterally constraining movement of the pivot plate when the pivot plate slides into the plate in a first direction. The at least one stopping structure is disposed on the plate for stopping a side of the pivot plate when the pivot plate has slid into the plate in the first direction completely. The monitor fixing mechanism further includes a fastening module for fastening the pivot plate on the support member when the pivot plate has slid into the plate in the first direction completely.

In summary, the monitor fixing mechanism of the present invention is designed for the quick release function so as to increase loading quantity, resulting in reducing of the transportation cost. Since no design change is required for a back cover of the display device by the quick release mechanism, it neither affects the appearance of the display device, nor occupies the mechanical space on the back cover of the display device. As a result, the present invention is capable of meeting requirements of the thinning tendency as well as improving the community.

These and other objectives of the present invention will no doubt become obvious to those of ordinary skill in the art after reading the following detailed description of the embodiment that is illustrated in the various figures and drawings.

DETAILED DESCRIPTION

Figure 1:
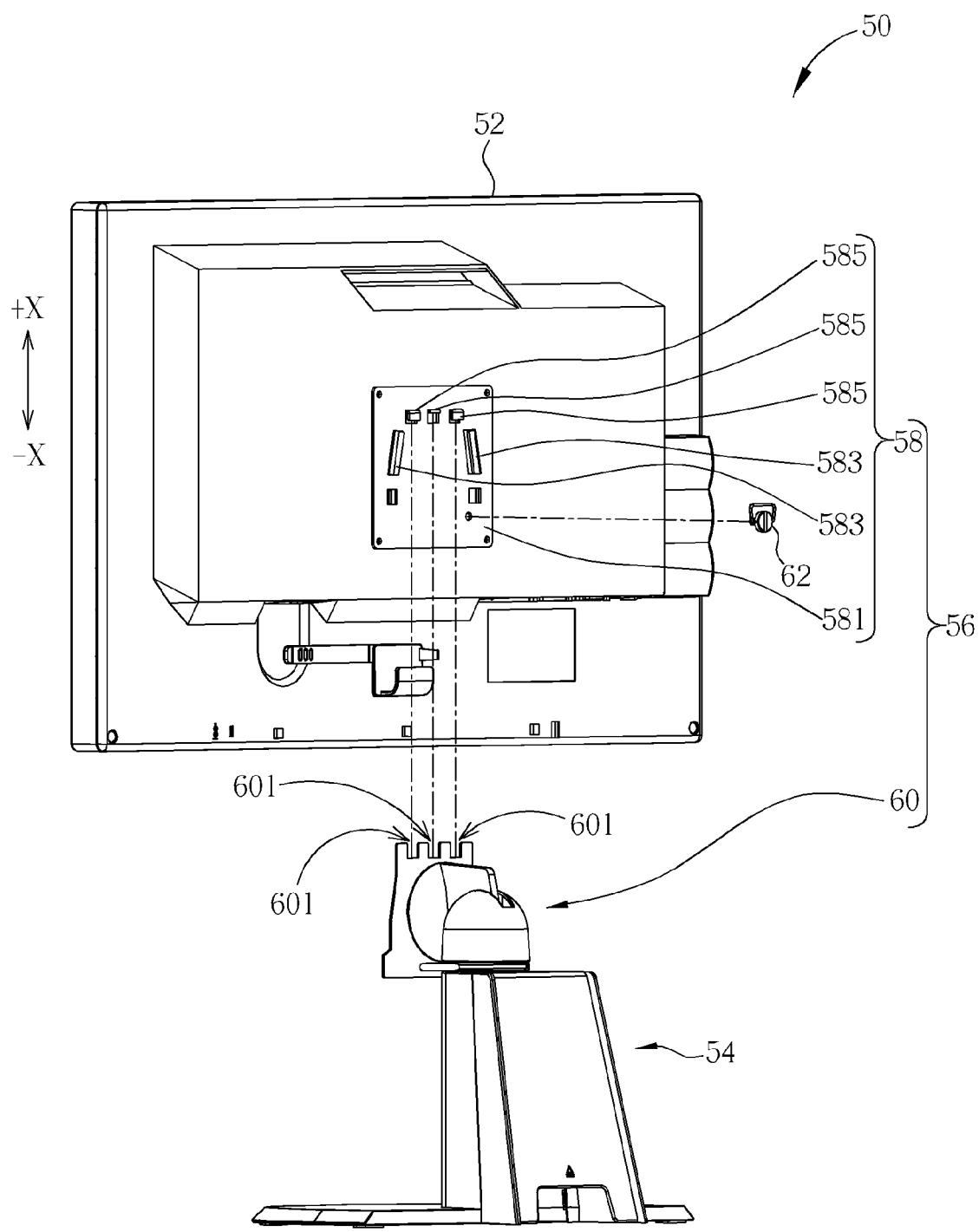
FIG. 1 is an exploded diagram of a display device according to a first embodiment of the present invention.

Please refer to FIG. 1. FIG. 1 is an exploded diagram of a display device 50 according to a first embodiment of the present invention. The display device 50 can be a liquid crystal display device and includes a monitor 52, a stand 54 and a monitor fixing mechanism 56. The stand 54 is for supporting the monitor 52, and the monitor fixing mechanism 56 is for fixing the monitor 52 on the stand 54. The monitor fixing mechanism 56 is designed for quick release. In other words, the monitor 52 can be installed on or detached from the stand 54 in a quick release manner. The monitor fixing mechanism 56 includes a support member 58 connected to the monitor 52 for supporting the monitor 52. The support member 58 can be a thin plate made in a stamping manner and fixed on the monitor 52. The monitor fixing mechanism 56 further includes a pivot plate 60. The pivot plate 60 is pivoted to the stand 54 and connected to the support member 58 in a detachable manner, so as to pivot the monitor 52 relative to the stand 54.

Furthermore, the support member 58 includes a plate 581 and at least one lateral guiding structure 583. The lateral guiding structure 583 is disposed on the plate 581 for laterally constraining movement of the pivot plate 60 when the pivot plate 60 slides into the plate 581 in a first direction (+X direction). The support member 58 further includes at least one stopping structure 585 disposed on the plate 581 for stopping a side of the pivot plate 60 when the pivot plate 60 has slid into the plate 581 in the first direction (+X direction) completely. For example, at least one positioning slot 601 is formed on the side of the pivot plate 60 for engaging with the corresponding stopping structure 585 when the pivot plate 60 has slid into the plate 581 in the first direction (+X direction) completely, so as to position the pivot plate 60 on the support member 58. In this embodiment, the plate 581, the lateral guiding structure 583 and the stopping structure 585 can be integrally formed, and the lateral guiding structure 583 and the stopping structure 585 can be extended and bent from the plate 581.

Figure 2:
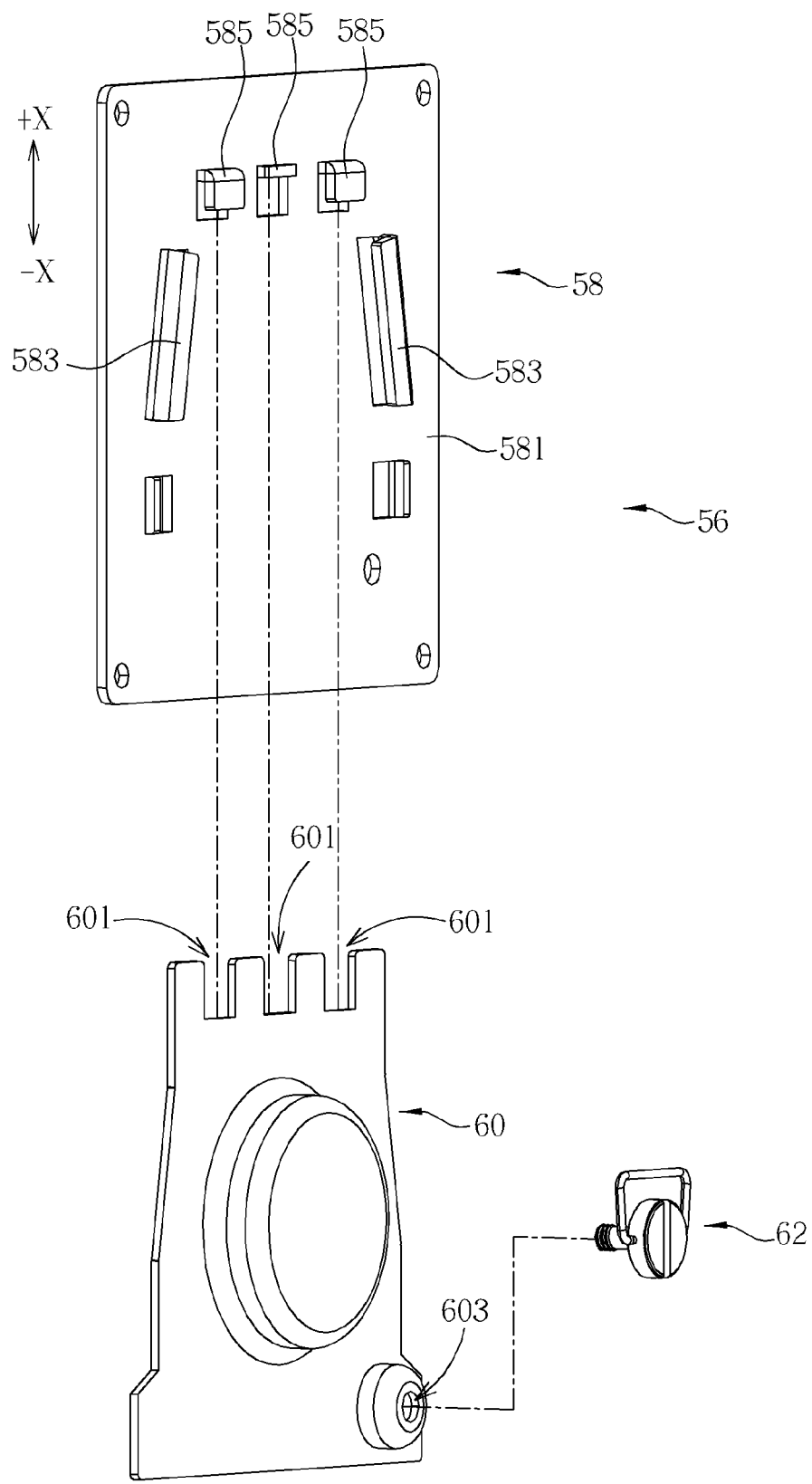
FIG. 2 is an exploded diagram of a monitor fixing mechanism according to the first embodiment of the present invention.
Figure 3:
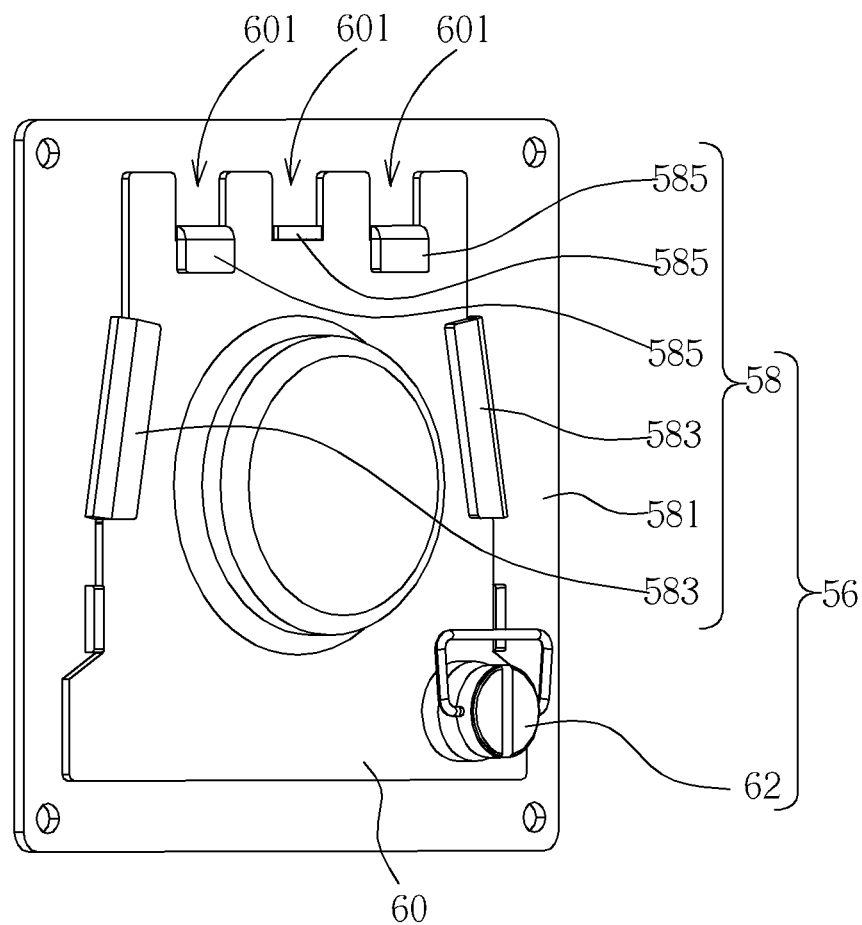
FIG. 3 is an assembly diagram of the monitor fixing mechanism according to the first embodiment of the present invention.

Please refer to FIG. 1 to FIG. 3. FIG. 2 is an exploded diagram of the monitor fixing mechanism 56 according to the first embodiment of the present invention. FIG. 3 is an assembly diagram of the monitor fixing mechanism 56 according to the first embodiment of the present invention. For assembling the monitor fixing mechanism, the pivot plate 60 can be slid into the plate 581 in the first direction (+X direction). In the meanwhile, the lateral guiding structure 583 can laterally constrain the movement of the pivot plate 60, so as to guide the pivot plate 60 to move in the first direction (+X direction) precisely. Then, when the pivot plate 60 has slid into the plate 581 in the first direction (+X direction) completely, the positioning slot 601 on the pivot plate 60 can engage with the corresponding stopping structure 585, so as to position the pivot plate 60 on the support member 58.

In order to position the pivot plate 60 on the support member 58 more stably, the monitor fixing mechanism 56 further includes a fastening module 62. The fastening module 62 is for fastening the pivot plate 60 on the support member 58 when the pivot plate 60 has slid into the plate 581 in the first direction (+X direction) completely. In this embodiment, the fastening module 62 can be a quick-release screw disposed through an opening 603 on the pivot plate 60 for screwing the pivot plate 60 on the support member 58, so as to achieve quick release function. In such a manner, an assembly of the monitor 52 and the stand 54 can be fixed. On the other hand, for detaching the monitor 52 from the stand 54, the quick-release screw can be detached from the pivot plate 60 first. Then, the pivot plate 60 can be slid out of the plate 581 of the support member 58 in a direction (−X direction) opposite to the first direction. In the meanwhile, the lateral guiding structure 583 can laterally constrain the movement of the pivot plate 60 as well, so as to guide the pivot plate 60 to move in the −X direction precisely, until the pivot plate 60 separates from the plate 581 completely. Accordingly, the monitor fixing mechanism 56 with the quick release function can be achieved.

Figure 4:
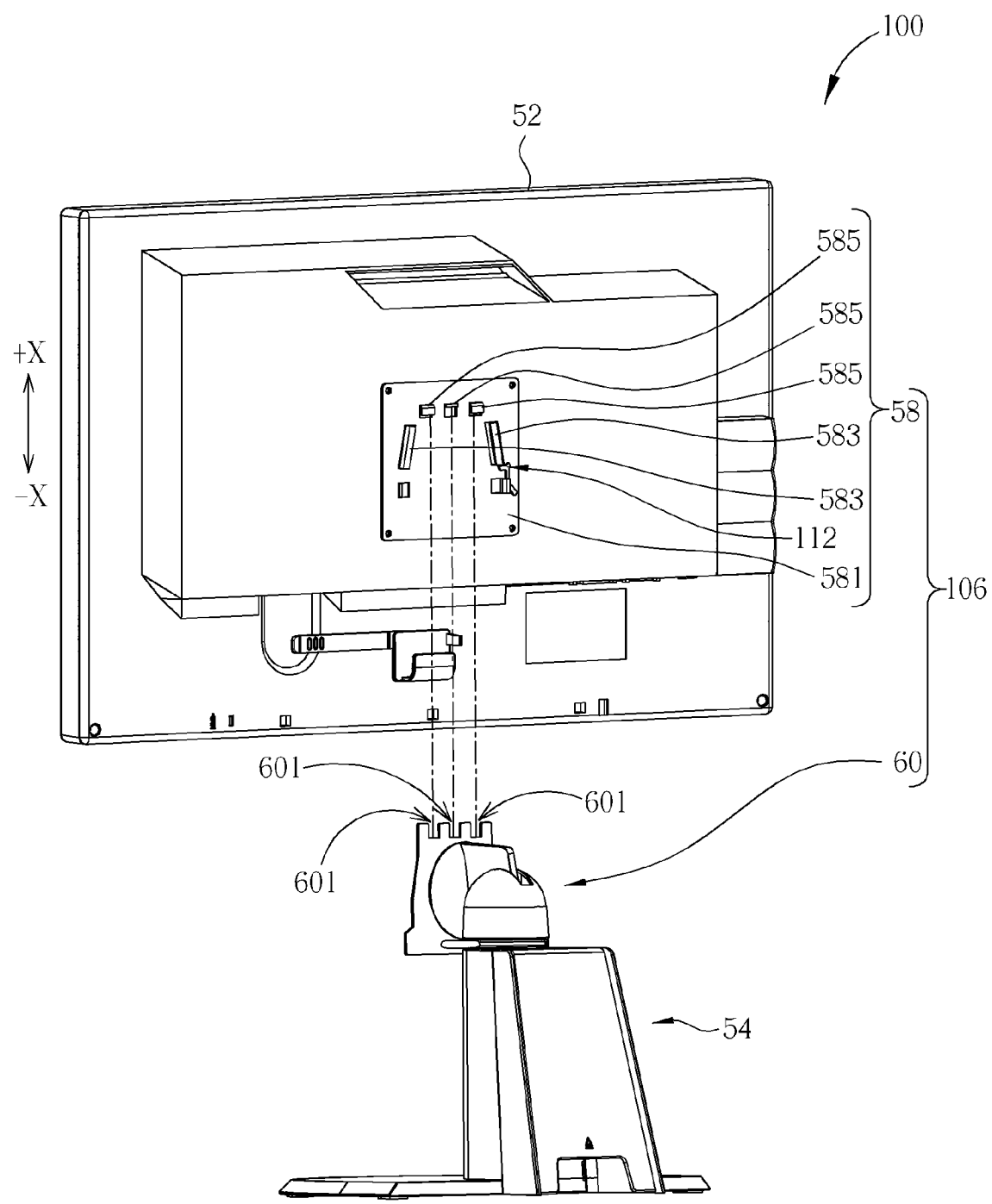
FIG. 4 is an exploded diagram of a display device according to a second embodiment of the present invention.
Figure 5:
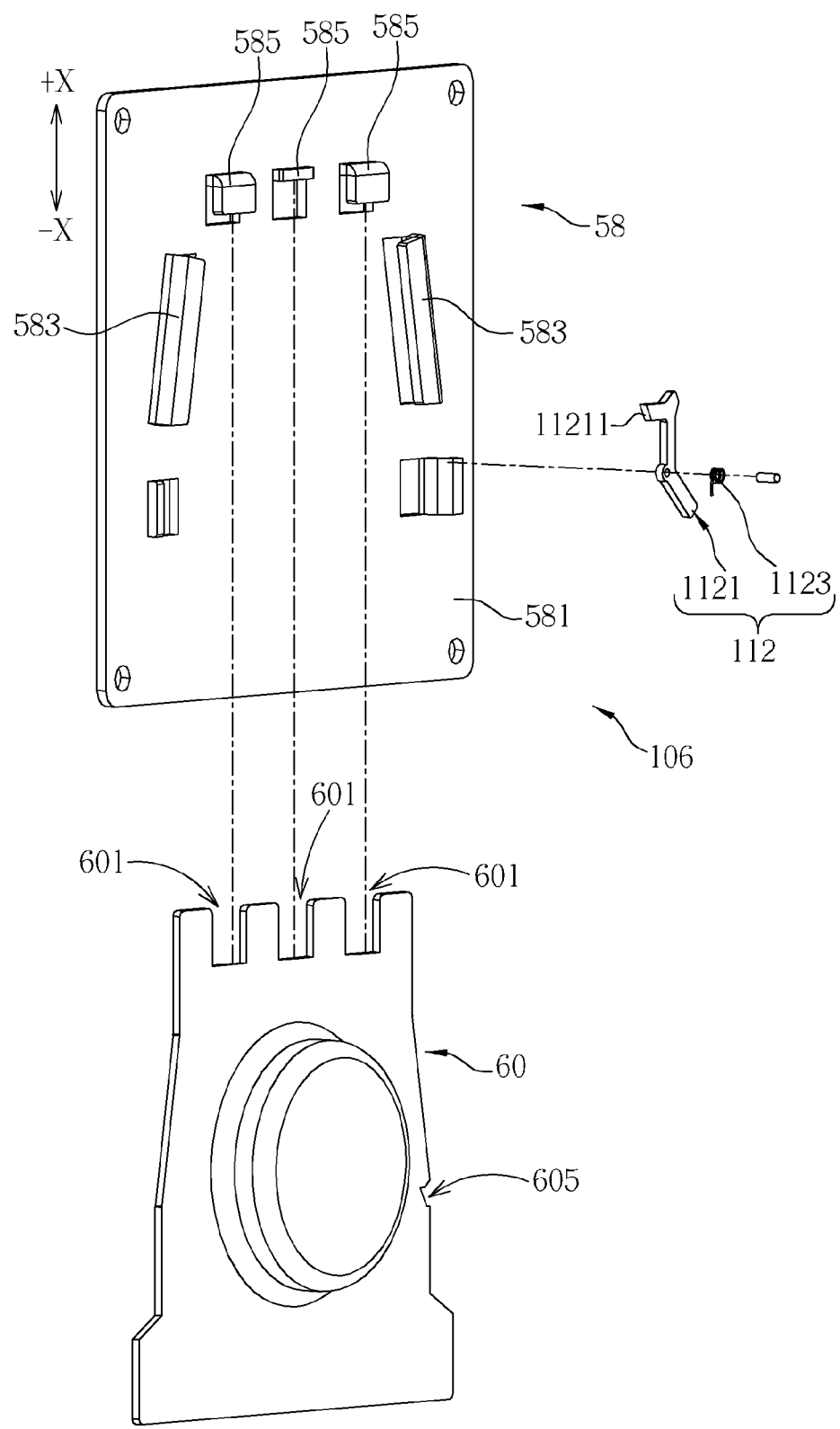
FIG. 5 is an exploded diagram of a monitor fixing mechanism according to the second embodiment of the present invention.
Figure 6:
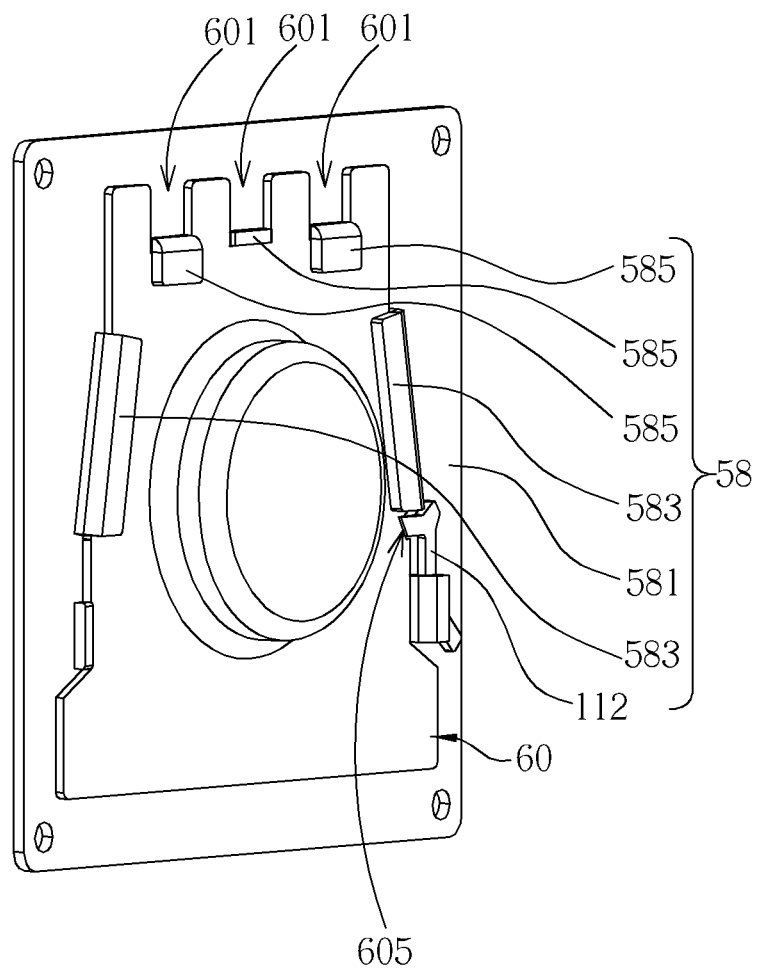
FIG. 6 is an assembly diagram of the monitor fixing mechanism according to the second embodiment of the present invention.

Please refer to FIG. 4 to FIG. 6. FIG. 4 is an exploded diagram of a display device 100 according to a second embodiment of the present invention. FIG. 5 is an exploded diagram of a monitor fixing mechanism 106 according to the second embodiment of the present invention. FIG. 6 is an assembly diagram of the monitor fixing mechanism 106 according to the second embodiment of the present invention. The monitor fixing mechanism 106 is designed for quick release. In other words, the monitor 52 can be installed on or detached from the stand 54 in a quick release manner. Components with the same denotes in this embodiment and in the aforesaid embodiment have the same structures and functions, and further description is omitted herein for simplicity. Similar to the first embodiment, for assembling the monitor fixing mechanism 106, the pivot plate 60 can be slid into the plate 581 in the first direction (+X direction). In the meanwhile, the lateral guiding structure 583 can laterally constrain the movement of the pivot plate 60, so as to guide the pivot plate 60 to move in the first direction (+X direction) precisely. Then, when the pivot plate 60 has slid into the plate 581 in the first direction (+X direction) completely, the positioning slot 601 on the pivot plate 60 can engage with the corresponding stopping structure 585, so as to position the pivot plate 60 on the support member 58.

In order to position the pivot plate 60 on the support member 58 more stably, the monitor fixing mechanism 106 further includes a fastening module 112. The fastening module 112 is for fastening the pivot plate 60 on the support member 58 when the pivot plate 60 has slid into the plate 581 in the first direction (+X direction) completely. In this embodiment, a breach 605 is formed on the pivot plate 60, and the fastening module 112 includes a latch 1121 and a resilient component 1123. The latch 1121 is pivoted to the support member 58 for hooking the breach 605 on the pivot plate 60, and the resilient component 1123 is connected to the latch 1121 for driving the latch 1121 to hook the breach 605 on the pivot plate 60, so as to fix the pivot plate 60 on the support member 58. In addition, an inclined plane 11211 is formed at an end of the latch 1121, and the inclined plane 11211 is pushed by the pivot plate 60 when the pivot plate 60 slides into the plate 581 in the first direction, so as to guide the latch 1121 to rotate. In the meanwhile, the latch 1121 drives the resilient component 1123 to deform resiliently. When the pivot plate 60 has slid into the plate 581 in the first direction (+X direction) completely, the latch 1121 is aligned with the breach 605 on the pivot plate 60, and the pivot plate 60 can not push the latch 1121 anymore. Accordingly, the resilient component 1123 can provide the latch 1121 with a resilient force, so as to drive the latch 1121 to hook the breach 605 on the pivot plate 60. In such a manner, an assembly of the monitor 52 and the stand 54 can be fixed. On the other hand, when the monitor 52 is desired to be detached from the stand 54, the latch 1121 is pushed to separate from the breach 605 on the pivot plate 60 first. Then, the pivot plate 60 can be slid out of the plate 581 of the support member 58 in the direction (−X direction) opposite to the first direction. In the meanwhile, the lateral guiding structure 583 can laterally constrain the movement of the pivot plate 60 as well, so as to guide the pivot plate 60 to move in the −X direction precisely, until the pivot plate 60 separates from the plate 581 completely. Accordingly, the monitor fixing mechanism 56 with the quick release function can be achieved.

Figure 7:
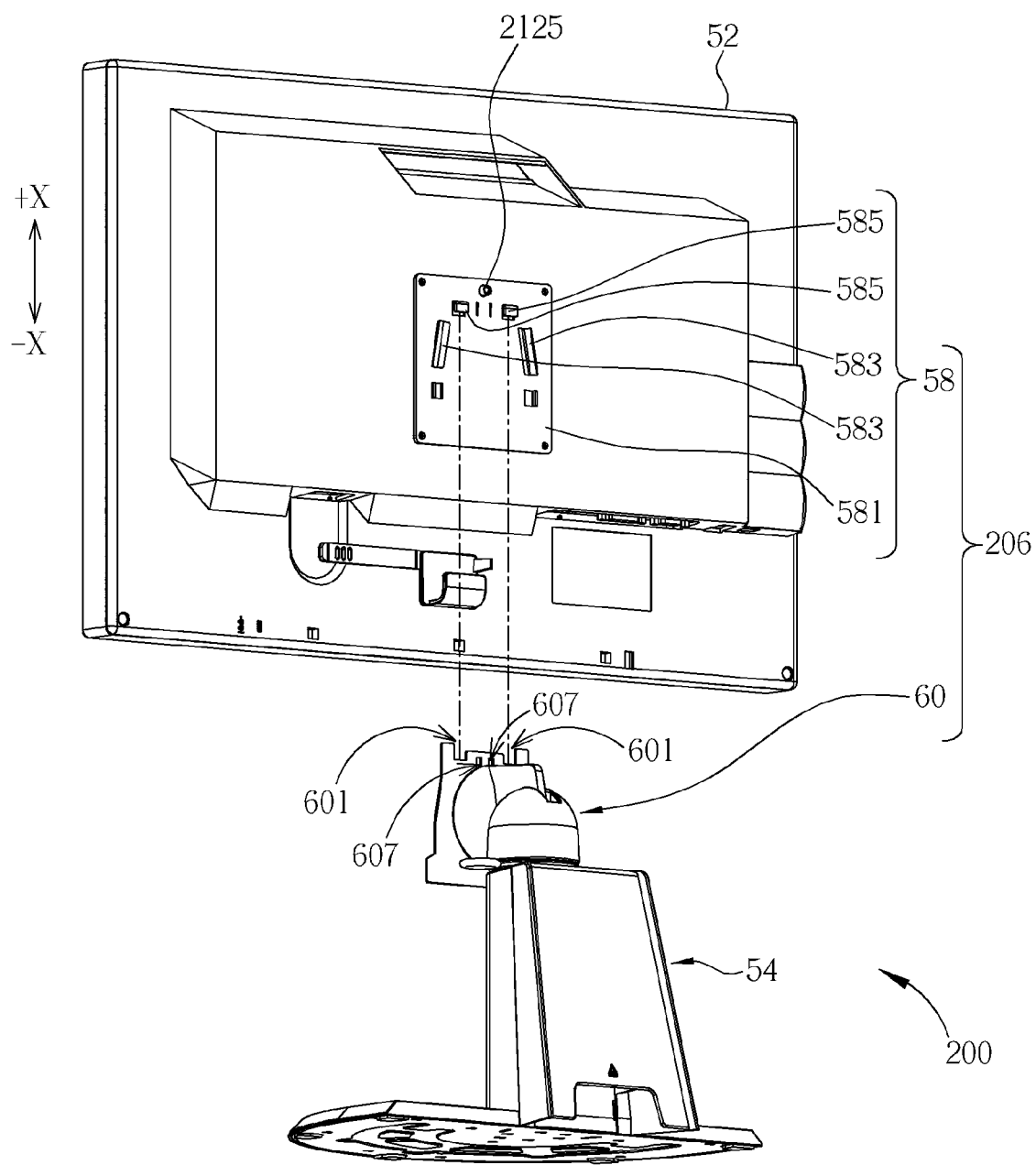
FIG. 7 is an exploded diagram of a display device according to a third embodiment of the present invention.
Figure 8:
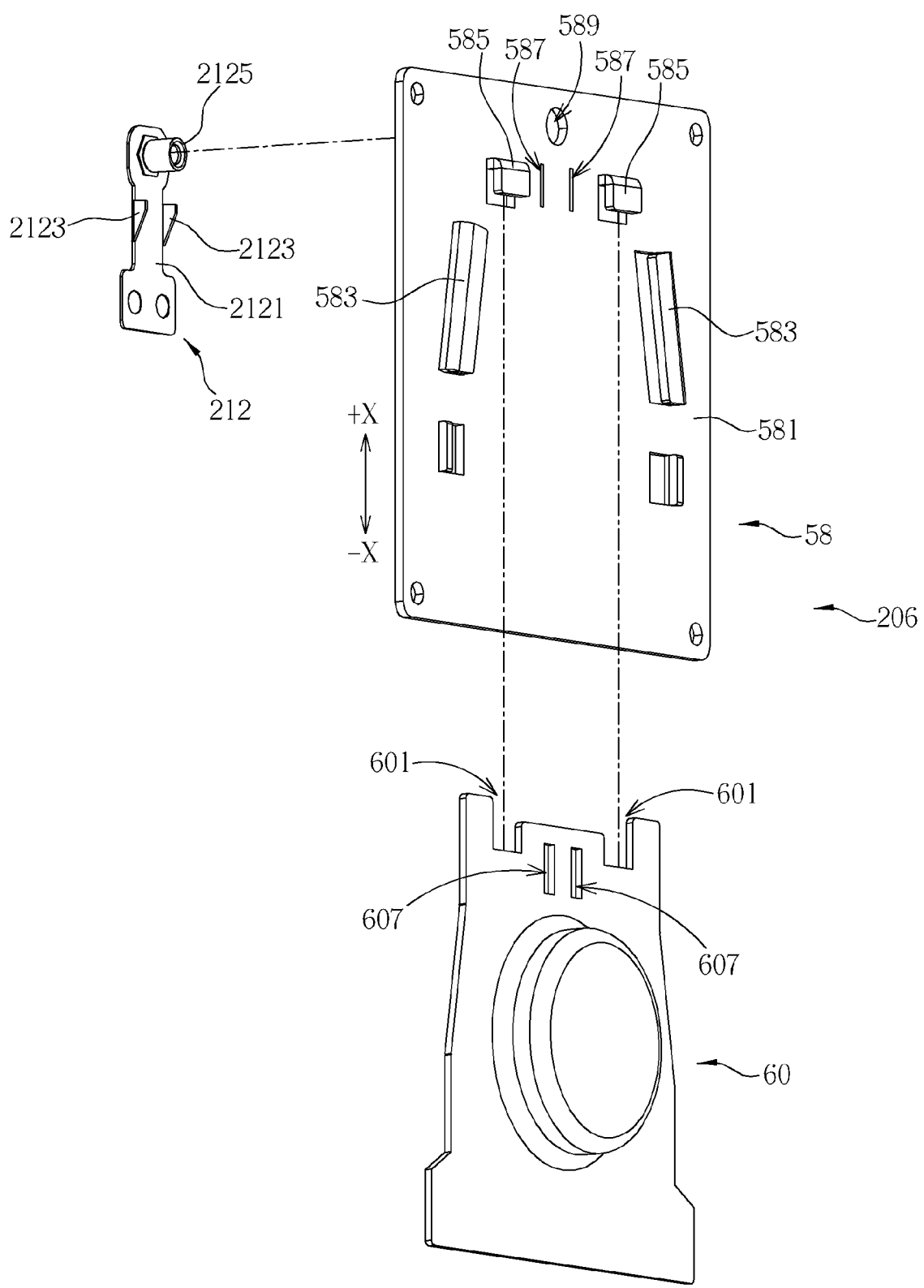
FIG. 8 is an exploded diagram of a monitor fixing mechanism according to the third embodiment of the present invention.
Figure 9:
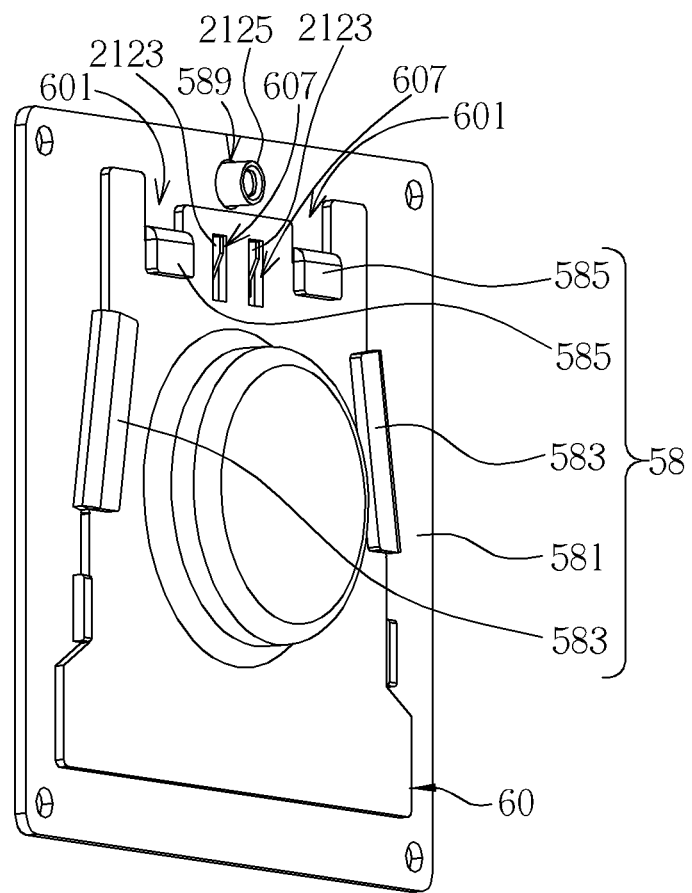
FIG. 9 is an assembly diagram of the monitor fixing mechanism according to the third embodiment of the present invention.

Please refer to FIG. 7 to FIG. 9. FIG. 7 is an exploded diagram of a display device 200 according to a third embodiment of the present invention. FIG. 8 is an exploded diagram of a monitor fixing mechanism 206 according to the third embodiment of the present invention. FIG. 9 is an assembly diagram of the monitor fixing mechanism 206 according to the third embodiment of the present invention. The monitor fixing mechanism 206 is designed for quick release. In other words, the monitor 52 can be installed on or detached from the stand 54 in a quick release manner. Components with the same denotes in this embodiment and in the aforesaid embodiments have the same structures and functions, and further description is omitted herein for simplicity. The monitor fixing mechanism 206 further includes a fastening module 212. The fastening module 212 is for fastening the pivot plate 60 on the support member 58 when the pivot plate 60 has slid into the plate 581 in the first direction (+X direction) completely. At least one first slot 607 is formed on the pivot plate 60, and at least one second slot 587 and a hole 589 are formed on the plate 581 of the support member 58. In this embodiment, there are two first slots 607 formed on the pivot plate 60, and there are two second slots 587 formed on the plate 581 of the support member 58. Furthermore, a position of each of the second slots 587 corresponds to that of the first slots 607. In other words, when the pivot plate 60 has slid into the plate 581 in the first direction (+X direction) completely, each of the second slots 587 can align with the corresponding first slots 607. The amounts and disposal positions of the first slots 607 and the second slots 587 are not limited to those mentioned in this embodiment, and it depends on practical demands. The fastening module 212 includes a release member 2121, at least one protruding portion 2123 and a protruding button 2125. An end of the release member 2121 is fixed to the support member 58, and the other end is a free end. Each of the protruding portion 2123 is connected to the release member 2121 for disposing through the corresponding the first slot 607 and the second slot 587, so as to fix the pivot plate 60 on the support member 58. In this embodiment, the fastening module 212 includes two protruding portions 2123 disposed on two sides of the release member 2121. The amount and disposal position of the protruding portions 2123 are not limited to those mentioned in this embodiment, and it depends on practical demands. The protruding button 2125 is disposed at another end of the release member 2121 for disposing through the hole 589 on the plate 581. The protruding button 2125 drives the protruding portion 2123 to separate from the corresponding first slot 607 and the second slot 587 in sequence.

Similar to the aforesaid embodiments, for assembling the monitor fixing mechanism 206, the pivot plate 60 can be slid into the plate 581 in the first direction (+X direction). In the meanwhile, the lateral guiding structure 583 can laterally constrain the movement of the pivot plate 60, so as to guide the pivot plate 60 to move in the first direction (+X direction) precisely. Simultaneously, a user can press the protruding button 2125 of the fastening module 212, so as to push the release member 2121 and the protruding portion 2123. Accordingly, the protruding portion 2123 connected to the release member 2121 can not interfere with the pivot plate 60 when the pivot plate 60 moves. When the pivot plate 60 has slid into the plate 581 in the first direction (+X direction) completely, the positioning slot 601 on the pivot plate 60 can engage with the corresponding stopping structure 585, so as to position the pivot plate 60 on the support member 58. In the meanwhile, the protruding button 2125 can be released. Accordingly, the release member 2121 connected to the protruding button 2125 can recover to an initial position resiliently, such that the protruding portion 2123 is disposed through the corresponding the first slot 607 and the second slot 587, so as to position the pivot plate 60 on the support member 58. In such a manner, an assembly of the monitor 52 and the stand 54 can be fixed, so as to achieve the quick release function. On the other hand, for detaching the monitor 52 from the stand 54, the protruding button 2125 of the fastening module 212 can be pressed again, so as to drive each of the protruding portion 2123 to separate from the corresponding first slot 607 and the second slot 587 in sequence. Then, the pivot plate 60 can be slid out of the plate 581 of the support member 58 in the direction (−X direction) opposite to the first direction. In the meanwhile, the lateral guiding structure 583 can laterally constrain the movement of the pivot plate 60 as well, so as to guide the pivot plate 60 to move in the −X direction precisely, until the pivot plate 60 separates from the plate 581 completely. Accordingly, the monitor fixing mechanism 56 with the quick release function can be achieved.

In contrast to the prior art, the monitor fixing mechanism of the present invention is designed for the quick release function so as to increase loading quantity, resulting in reducing of the transportation cost. Since no design change is required for a back cover of the display device by the quick release mechanism, it neither affects the appearance of the display device, nor occupies the mechanical space on the back cover of the display device. As a result, the present invention is capable of meeting requirements of the thinning tendency as well as improving the community.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A monitor fixing mechanism for fixing a monitor, the monitor fixing mechanism comprising:
    a pivot plate pivoted to a stand, at least one first slot being formed on the pivot plate;
    a support member connected to the monitor for supporting the monitor, the pivot plate being connected to the supporting member in a detachable manner, so as to pivot the monitor relative to the stand, the support member comprising:
        a plate, at least one second slot and a hole being formed on the plate of the support member, the at least one second slot and the hole being not communicated with each other, and the at least one second slot being located in a position corresponding to the at least one first slot;
        at least one lateral guiding structure disposed on the plate for laterally constraining movement of the pivot plate when the pivot plate slides into the plate in a first direction; and
        at least one stopping structure disposed on the plate for stopping a side of the pivot plate when the pivot plate has slid into the plate in the first direction completely; and
    a fastening module for fastening the pivot plate on the support member when the pivot plate has slid into the plate in the first direction completely, the fastening module comprising:
        a release member with an end fixed to the support member;
        at least one protruding portion connected to the release member for disposing through the at least one first slot and the at least one second slot, so as to fix the pivot plate on the support member; and
        a protruding button disposed at another end of the release member for disposing through the hole on the plate, the protruding button and the at least one protruding portion be separated from each other, the protruding button driving the at least one protruding portion to separate from the at least one first slot and the at least one second slot in sequence when being pushed.

2. The monitor fixing mechanism of claim 1, wherein at least one positioning slot is formed on the side of the pivot plate for engaging with the corresponding at least one stopping structure when the pivot plate has slid into the plate in the first direction completely, so as to position the pivot plate on the support member.

3. A display device, comprising:
    a monitor;
    a stand for supporting the monitor; and
    a monitor fixing mechanism for fixing the monitor, the monitor fixing mechanism comprising:
        a pivot plate pivoted to the stand, at least one first slot being formed on the pivot plate;
        a support member connected to the monitor for supporting the monitor, the pivot plate being connected to the supporting member in a detachable manner, so as to pivot the monitor relative to the stand, the support member comprising:
            a plate, at least one second slot and a hole being formed on the plate of the support member, the at least one second slot and the hole being not communicated with each other, and the at least one second slot being located in a position corresponding to the at least one first slot;
            at least one lateral guiding structure disposed on the plate for laterally constraining movement of the pivot plate when the pivot plate slides into the plate in a first direction; and
            at least one stopping structure disposed on the plate for stopping a side of the pivot plate when the pivot plate has slid into the plate in the first direction completely; and
        a fastening module for fastening the pivot plate on the support member when the pivot plate has slid into the plate in the first direction completely, the fastening module comprising:
            a release member with an end fixed to the support member;
            at least one protruding portion connected to the release member for disposing through the at least one first slot and the at least one second slot, so as to fix the pivot plate on the support member; and
            a protruding button disposed at another end of the release member for disposing through the hole on the plate, the protruding button and the at least one protruding portion be separated from each other, the protruding button driving the at least one protruding portion to separate from the at least one first slot and the at least one second slot in sequence when being pushed.

4. The display device of claim 3, wherein at least one positioning slot is formed on the side of the pivot plate for engaging with the corresponding at least one stopping structure when the pivot plate has slid into the plate in the first direction completely, so as to position the pivot plate on the support member.

* * * * *